United States Patent
Greiner et al.

(10) Patent No.: US 7,624,237 B2
(45) Date of Patent: Nov. 24, 2009

(54) COMPARE, SWAP AND STORE FACILITY WITH NO EXTERNAL SERIALIZATION

(75) Inventors: Dan F. Greiner, San Jose, CA (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/416,572

(22) Filed: May 3, 2006

(65) Prior Publication Data
US 2007/0260826 A1 Nov. 8, 2007

(51) Int. Cl.
*G06F 13/00* (2006.01)
(52) U.S. Cl. ...................... 711/150; 711/152
(58) Field of Classification Search ............. 711/150, 711/152
See application file for complete search history.

(56) References Cited

U.S. PATENT DOCUMENTS

| | | | | |
|---|---|---|---|---|
| 3,886,525 | A | * | 5/1975 | Brown et al. ............... 711/147 |
| 4,021,655 | A | * | 5/1977 | Healey et al. .............. 708/518 |
| 5,613,086 | A | * | 3/1997 | Frey et al. .................. 711/152 |
| 5,893,157 | A | | 4/1999 | Greenspan et al. .......... 711/150 |
| 5,895,492 | A | | 4/1999 | Greenspan et al. .......... 711/147 |
| 6,128,710 | A | * | 10/2000 | Greenspan et al. .......... 711/152 |
| 6,223,335 | B1 | | 4/2001 | Cartwright, Jr. et al. ....... 717/1 |
| 2004/0103110 | A1 | | 5/2004 | Goode et al. ................ 707/101 |
| 2004/0236914 | A1 | | 11/2004 | Day et al. ................... 711/152 |

OTHER PUBLICATIONS

Hennessy, J., and Patterson, D., Computer Organization and Design, the Hardware/Software Interface, 2nd Edition, Morgan Kaufmann, 1998 pp. 424-425.*

* cited by examiner

*Primary Examiner*—Matt Kim
*Assistant Examiner*—John P Fishburn
(74) *Attorney, Agent, or Firm*—John E. Campbell; Blanche E. Schiller, Esq.; Heslin Rothenberg Farley & Mesiti P.C.

(57) ABSTRACT

A compare, swap and store facility is provided that does not require external serialization. A compare and swap operation is performed using an interlocked update operation. If the comparison indicates equality, a store operation is performed. The compare, swap and store operations are performed as a single unit of operation.

9 Claims, 5 Drawing Sheets

COMPARE, SWAP AND STORE FACILITY WITH NO EXTERNAL SERIALIZATION

TECHNICAL FIELD

This invention relates, in general, to processing within a processing environment, and in particular, to a compare, swap and store facility that requires no external serialization.

BACKGROUND OF THE INVENTION

To perform a comparison and conditional update of a field, a compare and swap instruction is employed. When a processor executes such an instruction, the compare and swap appears to occur as a single atomic unit of operation, as observed by other processors within the processing environment. The compare and swap is performed using an interlocked update operation that ensures the integrity of the environment. This type of operation is useful in the management of locks, queues, counters, and so forth.

In addition to the compare and swap instruction, a perform locked operation (PLO) instruction is employed as a mechanism in which a processor performs multiple serialized operations, such as compare and swap and store, compare and swap and double store, compare and swap and triple store, and so forth. The perform locked operation provides this functionality by using an external point of serialization (e.g., a lock). The compare and swap of the perform locked operation is not defined to be an interlocked update. Therefore, if an application uses a perform locked operation to manipulate data, all of the updates to the data must be performed using a perform locked operation to maintain integrity of the data. That is, the compare and swap instruction cannot be intermixed with the perform locked operation.

SUMMARY OF THE INVENTION

Based on the foregoing, a need exists for a compare and swap and store function that can be intermixed with a compare and swap instruction. In particular, a need exists for the ability to perform a compare and swap and store operation without having to rely on the perform locked operation instruction. Yet further, a need exists for a capability that provides a compare, swap and store operation that does not rely on an external serialized function.

The shortcomings of the prior art are overcome and additional advantages are provided through the provision of a method of processing in a processing environment. The method includes, for instance, comparing one operand and another operand; replacing an operand of the one operand and the another operand, in response to the comparing indicating equality, wherein the comparing and the replacing are performed as an interlocked update operation; and storing a value, in response to the replacing, wherein the comparing, replacing and storing are performed by a processor of the processing environment as a single unit of operation.

In another aspect, an instruction to be executed within a processing environment is provided. The instruction includes, for instance, an operation code to identify an instruction to be executed; a first set of one or more fields used to locate a first operand; a second set of one or more fields used to locate a second operand; and a third field used to locate a third operand, the third operand to be compared with the first operand, a replacement value to be placed in a location of the first operand, in response to the comparison indicating equality, and a store value stored in a location of the second operand, in response to placing the replacement value.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a compare, swap and store facility is provided that does not require separate external serialization. Instead, a compare and conditional swap operation is performed using an interlocked update operation. Further, if the comparison is equal, a store operation follows. The compare, swap and store operations appear to be a single unit of operation, as observed by the processor of the processing environment executing the operations.

Figure 1:
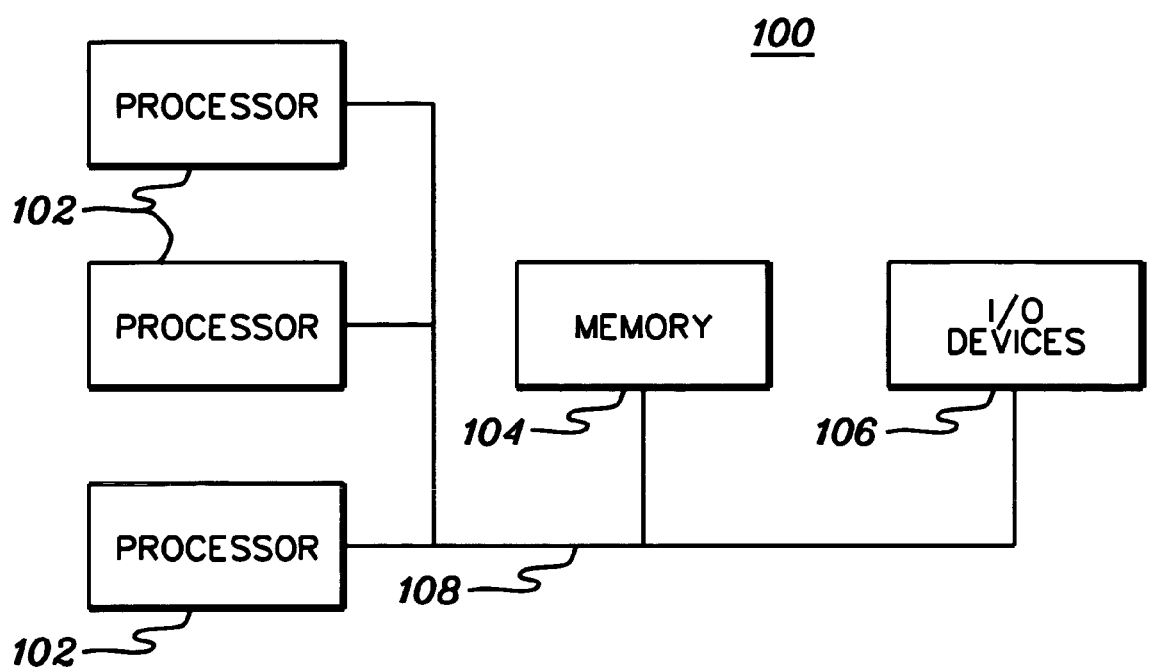
FIG. 1 depicts one embodiment of a processing environment incorporating and using one or more aspects of the present invention.

One embodiment of a processing environment incorporating and using one or more aspects of the present invention is described with reference to FIG. 1. Processing environment 100 is, for instance, a multi-processing environment including a plurality of processors 102 (e.g., central processing units (CPUs)), a memory 104 (e.g., main memory) and one or more input/output (I/O) devices 106 coupled to one another via, for example, one or more buses 108 or other connections.

As one example, each processor 102 is a zSeries® server, offered by International Business Machines Corporation, Armonk, N.Y., and one or more of the processors execute an operating system, such as z/OS®, also offered by International Business Machines Corporation. (zSeries and z/OS are registered trademarks of International Business Machines Corporation, Armonk, N.Y., USA. Other names used herein may be registered trademarks, trademarks or product names of International Business Machines Corporation or other companies.)

Processing within the processing environment is facilitated by the provision of a compare, swap and store facility that enables a compare, swap and store operation to be performed as a single unit of operation and without requiring external serialization (e.g., a lock). In one example, the compare and swap operation of the compare, swap and store facility is performed using a block concurrent interlocked update operation. Further, if the compare is equal, then it is followed by a block concurrent store operation. Block concurrency ensures that all bytes of the operands are fetched/stored together. The interlocked update ensures no other processors can access the storage operands while compare/swap is in progress. The compare and swap and store operations appear to be a single unit of operation. This ensures that the processor executing the compare, swap and store facility cannot be interrupted between the compare and swap operation and the store operation.

Figure 2:
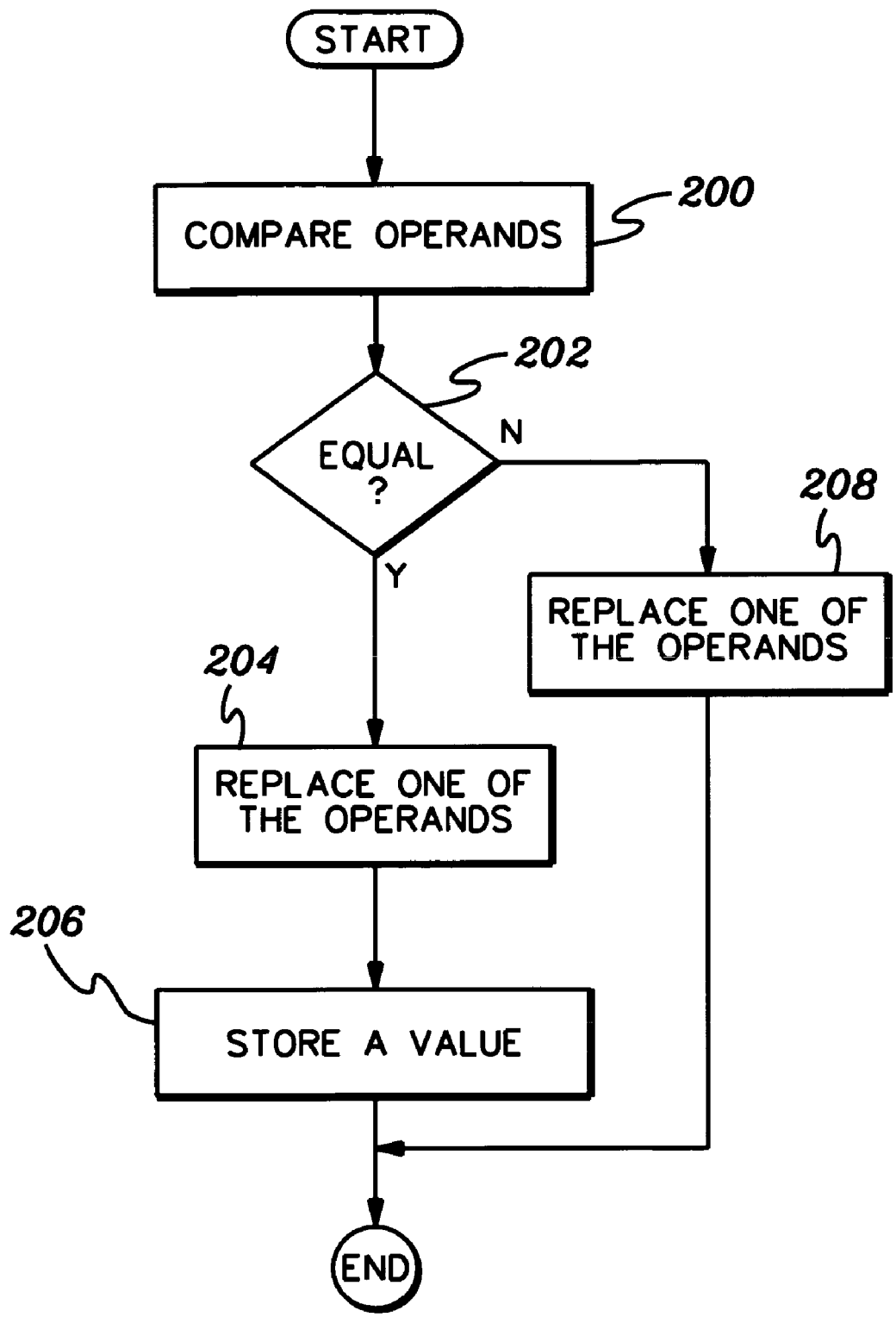
FIG. 2 depicts one embodiment of the logic associated with a compare, swap and store facility, in accordance with an aspect of the present invention.

One embodiment of the logic associated with a compare, swap and store facility is described with reference to FIG. 2. This logic is executed by a processing unit of the processing environment, in response to, for instance, a request by an application.

Initially, one specified operand and at least one other specified operand are compared, STEP 200. If the comparison indicates equality, INQUIRY 202, then one of the operands is replaced, as designated by the facility, STEP 204. Further, a value is stored, STEP 206. The compare, replace and store are performed as one single operation, as it appears to the processing unit performing the processing.

Returning to INQUIRY 202, if the comparison indicates inequality, then one of the operands is replaced, as designated by the facility, STEP 208, but no store is performed.

In one example, the compare, swap and store operations are performed by a single instruction. The instruction can be implemented in many architectures and may be emulated. As examples, the instruction is executed in hardware by a processor; or by emulation of an instruction set that includes this instruction, by software executing on a processing unit having a different native instruction set. In one particular example, the instruction is implemented in the z/Architecture, offered by International Business Machines Corporation, and is referred to herein as a Compare and Swap and Store (CSST) instruction.

Figure 3:
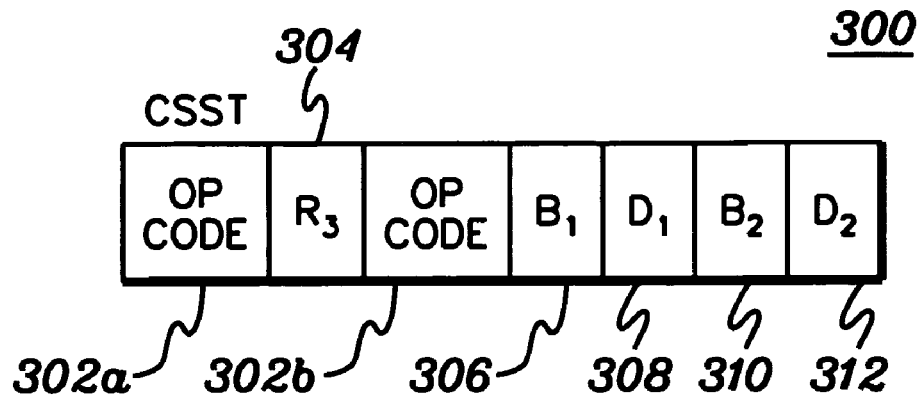
FIG. 3 depicts one example of a format of a compare and swap and store instruction, in accordance with an aspect of the present invention.

A Compare and Swap and Store instruction 300 (FIG. 3) includes, for instance, an operation code 302a, 302b designating the Compare and Swap and Store instruction; a general register 304, the contents of which specify a third operand used by the instruction; a base register 306, which may be any of sixteen general purpose registers of the processing unit and includes a portion of an address of a first operand in storage used by the instruction; a displacement value 308, which is for instance, an unsigned 12 bit binary number added to the contents of register 306 to provide the address of the first operand in storage; a base register 310, which again is any of the sixteen general purpose registers in the processing unit and includes a portion of an address of a second operand in storage used by the instruction; and a displacement value 312, which is added to the contents of register 310 to provide the address of the second operand in storage for the instruction.

In addition to the registers described above, the Compare and Swap and Store instruction also implicitly uses two general registers that do not have to be encoded in the instruction, but are used by the instruction. These registers include general register 0 and general register 1.

Figure 4A:
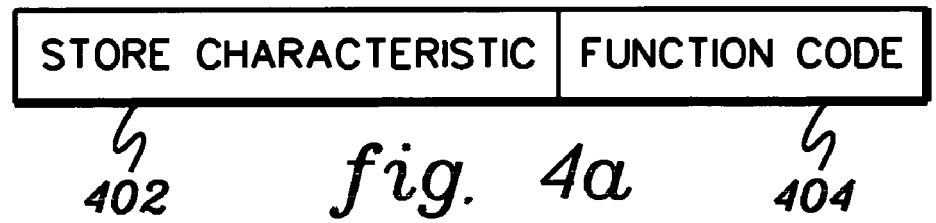
FIG. 4a depicts one embodiment of the fields of general register 0 used by the compare and swap and store instruction of one aspect of the present invention.

General register 0 (400, FIG. 4a) includes, for instance, a store characteristic 402 that is used to determine the size of the store value and an alignment of the second operand. The store characteristic is expressed as a power of two: a value of 0 indicates that one byte is stored on a byte boundary; a value of 1 indicates that two bytes are stored on a halfword boundary, and so forth. The store value may be 1, 2, 4, 8 or 16 bytes in length, as examples.

General register 0 also includes, for instance, a function code 404. The contents of the function code determine the size of the first and third operands, the size of the replacement value, and an alignment of the first operand. Examples of function code values are as follows:

When the function code is 0, the operands are 32 bits in length. The first operand is a fullword in storage, and the third operand is in specified bits (e.g., bits 32-63) of general register $R_3$. The replacement value is in specified bytes (e.g., bytes 12-15) of the parameter list.

When the function code is 1, the operands are 64 bits in length. The first operand is a doubleword in storage, and the third operand is in specified bits (e.g., bits 0-63) of general register $R_3$. The replacement value is in specified bytes (e.g., bytes 9-15) of the parameter list.

When the function code is 2, the operands are 128 bits in length. The first operand is a quadword in storage, and the third operand is in specified bits (e.g., bits 0-63) of general registers $R_3$ and $R_3+1$. The replacement value is in specified bytes (e.g., bytes 0-15) of the parameter list.

Figure 4B:
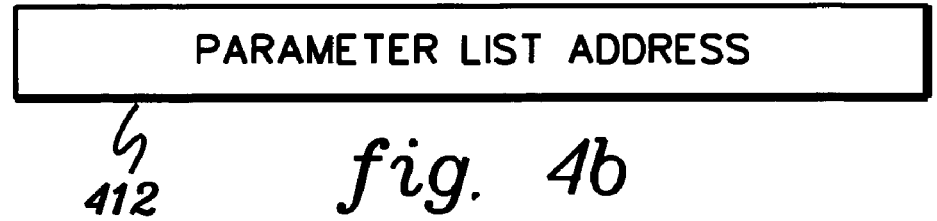
FIG. 4b depicts one embodiment of the fields of general register 1 employed by the compare and swap and store instruction of one aspect of the present invention.
Figure 4C:
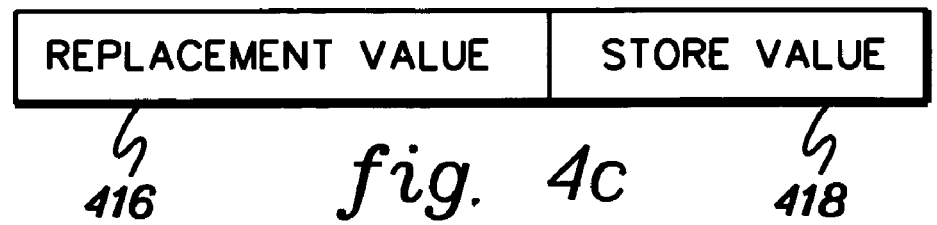
FIG. 4c depicts one embodiment of the fields associated with a parameter list employed by the compare and swap and store instruction of one aspect of the present invention.

General register 1 (410; FIG. 4b) includes, for instance, a logical address 412 of a parameter list 414 (FIG. 4c). The parameter list includes a replacement value 416 and a store value 418. The parameter list is treated as being on a quadword boundary, in one example. (In access register mode, the contents of access register 1 are used to access the parameter list.)

The handling of the parameter list address is dependent on the addressing mode. In the 24-bit addressing mode, the contents of, for instance, bit positions 40-59 include the address. In the 31-bit addressing mode, the contents of, for instance, bit positions 33-59 include the address. In the 64-bit addressing mode, the contents of, for instance, bit position 0-59 of the register include the address.

Although examples of registers are described above, each of the registers may include more, less or different information. Further, each may include additional data not necessarily needed in one or more aspects of the present invention. The specific location within the registers for the information is implementation and/or architecture dependent.

Figure 5:
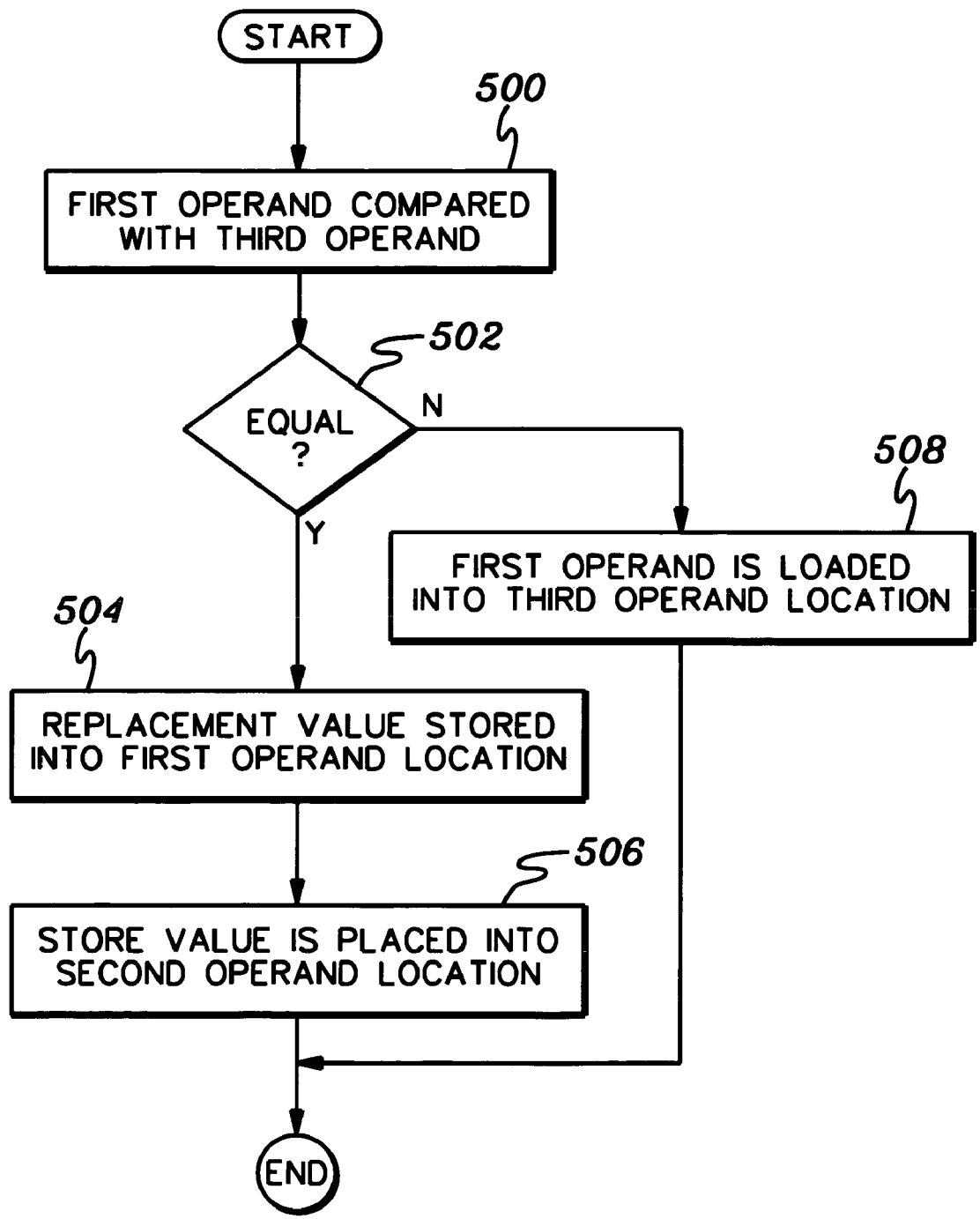
FIG. 5 depicts one embodiment of the logic associated with executing the compare and swap and store instruction, in accordance with an aspect of the present invention.

One embodiment of the logic associated with the Compare and Swap and Store instruction is described with reference to FIG. 5. As one example, this instruction is executed by a processor of the processing environment. In response to executing the instruction, the first operand designated in the instruction (e.g., by $B_1$ and $D_1$) is compared with the third operand, which is retrieved from the contents of the general register denoted by $R_3$, STEP 500. If they are equal, INQUIRY 502, then a replacement value retrieved from the parameter list is stored into the location of the first operand, STEP 504. Additionally, a store value retrieved from the parameter list is placed into the location of the second operand, STEP 506.

The fetch of the first operand for purposes of comparison and the store of the replacement value into the first operand location both appear to be a block concurrent interlocked update reference, as observed by other processors of the processing environment. The fetch and store of the store value appears to be a block concurrent update, as observed by other processors of the processing environment. It is unpredictable whether fetches from the parameter list precede the compare and swap operation.

Returning to INQUIRY 502, when the first operand is unequal to the third operand, the first operand is loaded into the location of the third operand, STEP 508, and the first operand remains unchanged. No store is performed. In a further example, the contents of the first operand may be fetched and subsequently stored back unchanged at the first operand location. This update is a block concurrent interlocked update reference, as observed by other CPUs of the processing environment.

Described in detail above is a compare and swap and store facility that does not require external serialization. Instead, a compare and swap operation is performed using a block concurrent interlocked update followed by (if the comparison is equal) a block concurrent store operation, all of which appear to be a single unit of operation to the processor executing the instruction. That is, the compare, swap and store operations are performed as part of one single instruction. The processor executing the instruction is not interrupted between the compare and swap operation and the store operation. Further, while the compare and swap is in progress, no other processors can access the storage operands.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
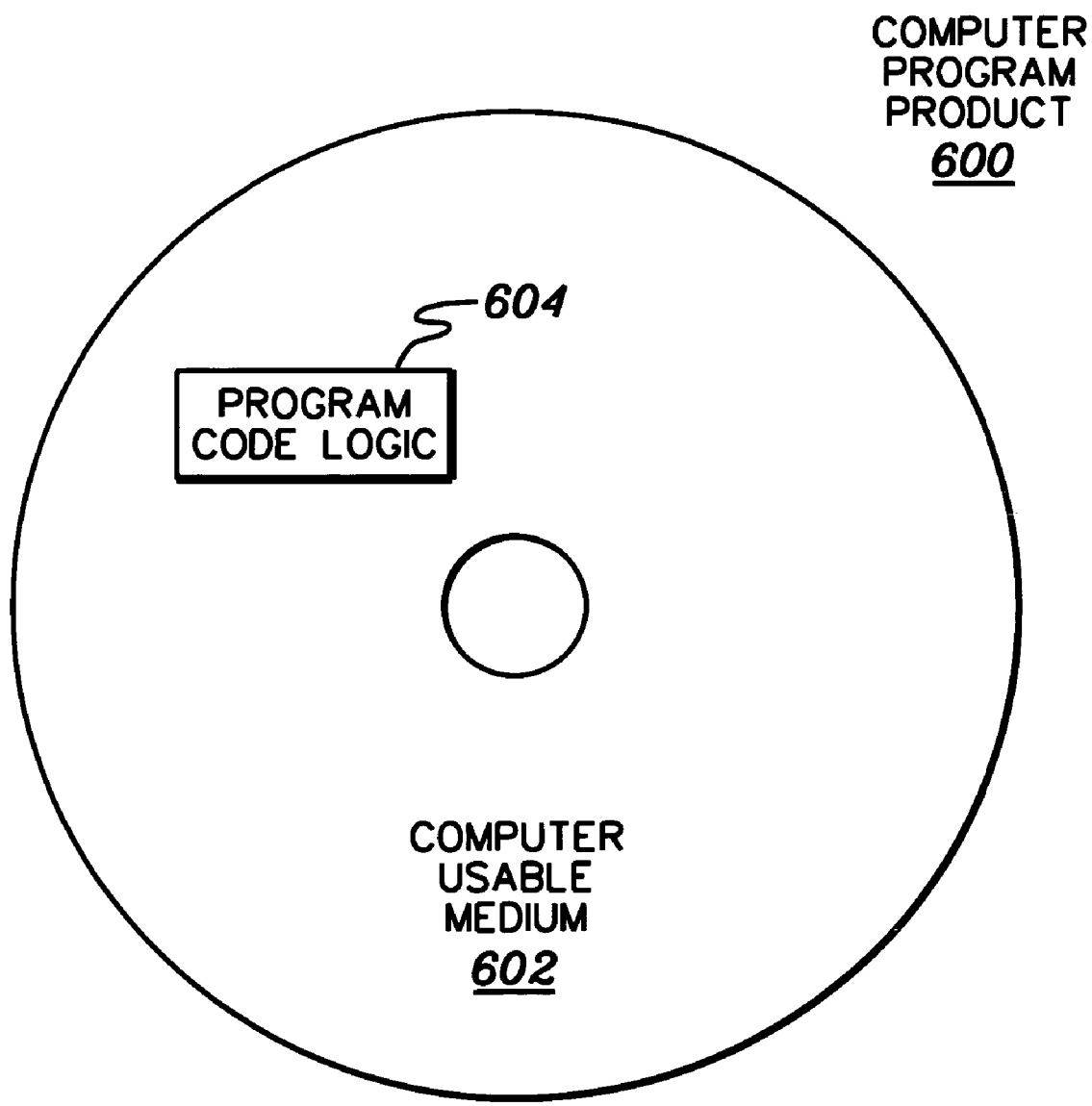
FIG. 6 depicts one example of a computer program product incorporating one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, one or more aspects of the present invention provide a compare, swap and store facility that does not require external serialization. Objects serialized with existing compare and swap operations can co-exist with the compare and swap and store operation of an aspect of the present invention. A single serialized update model is not required.

One or more aspects of the present invention provide robust recovery support for compare and swap operations. For instance, in many cases after a successful compare and swap is issued, programs set a footprint to inform their recovery routines that additional activities are required to undo the successful compare and swap operation. One example is when a use count is incremented using compare and swap, such that if the program abnormally terminates, the recovery routine is to remember to decrement that use count. However, if the compare and swap and the setting of the footprint are performed using two separate instructions, there is a small timing window where the compare and swap could be successful, but the footprint not be set, due to being interrupted and subsequently terminated between those two instructions. In this case, the recovery routine would not know that the use count needed to be decremented. Advantageously, this is avoided with the compare and swap and store operation of an aspect of the present invention, since that timing window is eliminated.

Further, up to, for instance, 16 bytes of information can be stored as part of the footprint setting operation. This additional robust recovery support allows significant new algorithmic opportunities, for enabled exploiters, to be explored using compare and swap based solutions. Given that the compare and swap operation is the most fine grained serialization possible, and that larger symmetric multiprocessing systems are likely in the future, this facility enables programs to have significantly better (recoverable) scalability characteristics than provided by others.

Advantageously, the compare and swap and store facility of one or more aspects of the present invention enable the compare, swap and store to occur without any interference from another processor of the processing environment. This ensures integrity of the data between the time it was examined and the time the result is stored. Further, the compare and swap and store are all performed within the unit of operation of a single instruction, again enabling the compare, swap and store operations to be performed uninterrupted by another processing unit.

Although one or more examples have been provided herein, these are only examples. Many variations are possible without departing from the spirit of the present invention. For instance, processing environments other than the example provided herein may include and/or benefit from one or more aspects of the present invention. As an example, one or more processors can be other than z/Series® processors and/or execute operating systems other than z/OS®. Further, the environment need not be based on the z/Architecture, but instead, can be based on other architectures, offered by, for instance, Intel, Sun Microsystems, as well as others. Yet further, the instruction can include other registers or entities other than registers to designate information. Further, different data and/or positioning within the registers and/or entities are possible. Many other variations exist.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

As used herein, the term "operand" not only includes and/or refers to operands of an instruction, but also other operands, as well as parameters or arguments passed between functions of programs, or any other data that is passed between entities.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for executing a machine instruction in a central processing unit, the method comprising:

fetching a machine instruction for execution, the machine instruction being defined for computer execution according to a computer architecture, the machine instruction comprising an opcode field, a first field comprising a first base field (B1) for identifying a first register and a first displacement field (D1) the content of which is added to the content of the first register to form the address of a first operand in a storage, a second field comprising a second base field (B2) for identifying a second register and a second displacement field (D2) the content of which is added to the content of the second register to form the address of a second operand in the storage, and a third field for identifying a third register (R3) containing a third operand; executing said fetched machine instruction, the execution comprising:

1) determining the address of the first operand in the storage;
2) fetching the first operand from the storage using an interlocked update reference that prevents other central processing units from making interfering accesses to the first operand in the storage until an interlocked update release is performed;
3) fetching the third operand contained in the third register;
4) comparing the first operand with the third operand;
5) responsive to the comparing the first operand with the third operand, if the first operand is equal to the third operand performing a) through c) comprising:
   a) storing a replacement value at the address of the first operand;
   b) performing an interlock-update-release thereby permitting other central processing units to access the first operand in the storage;
   c) storing a retrieved store value at the address of the second operand; and
6) responsive to the comparing the first operand with the third operand, if the first operand is not equal to the third operand, performing d) through e) comprising:
   d) storing the first operand in the third register; and
   e) performing an interlock-update-release thereby permitting other central processing units to access the first operand in the storage;

wherein the machine instruction can be intermixed with a compare and swap instruction that utilizes an interlocked update operation.

2. The method according to claim 1, wherein the fetching and storing are block concurrent, wherein block concurrent operations are characterized as ensuring that all bytes of an operand are accessed together.

3. The method according to claim 1, wherein the operands are not locked for exclusive use of the machine instruction by external serialization prior to the execution of the machine instruction.

4. The method according to claim 1, wherein the execution appears as a single unit of operation to the central processing unit executing the instruction and wherein the execution of said fetched machine instruction is not interruptible.

5. The method according to claim 1, comprising fetching a store characteristic from a fourth register, the store characteristic determining a store size value of the retrieved store value stored at the address of the second operand.

6. The method according to claim 5, comprising fetching a function code from the fourth register, the function code specifying the size of the first operand, the size of the third operand and the size of the replacement value.

7. The method according to claim 1, wherein 5) performing a) through c) comprises:

fetching an address of a parameter list from a fifth register, the parameter list comprising the replacement value and the store value;

fetching the replacement value from the parameter list; and retrieving the retrieved store value from the parameter list.

8. The method according to claim 1, wherein the machine instruction is an instruction of a first computer architecture wherein the machine instruction is fetched and executed by a central processing unit of an alternate computer architecture, the method comprising:

interpreting the machine instruction to identify a predetermined software subroutine for emulating the operation of the machine instruction, the predetermined software subroutine comprising a plurality of instructions; and
executing the predetermined software subroutine to perform the method for executing the machine instruction.

9. The method according to claim 1, wherein the contents of the first operand is 16 bytes and the retrieved store value is 16 bytes.

* * * * *